(12) United States Patent
Ilyadis

(10) Patent No.: US 9,781,564 B2
(45) Date of Patent: Oct. 3, 2017

(54) CALIBRATION OF WLAN ACCESS POINTS FOR LOCATION SERVICES

(71) Applicant: Avago Technologies General IP (Singapore) Pte. Ltd., Singapore (SG)

(72) Inventor: Nicholas Ilyadis, Merrimack, NH (US)

(73) Assignee: Avago Technologies General IP (Singapore) Pte. Ltd.

( * ) Notice: Subject to any disclaimer, the term of this patent is extended or adjusted under 35 U.S.C. 154(b) by 0 days.

(21) Appl. No.: 14/985,982

(22) Filed: Dec. 31, 2015

(65) Prior Publication Data

US 2017/0150313 A1 May 25, 2017

Related U.S. Application Data

(60) Provisional application No. 62/258,358, filed on Nov. 20, 2015.

(51) Int. Cl.
*H04W 24/00* (2009.01)
*H04W 4/02* (2009.01)
*H04B 17/21* (2015.01)

(52) U.S. Cl.
CPC ............ *H04W 4/023* (2013.01); *H04B 17/21* (2015.01)

(58) Field of Classification Search
USPC ............................................ 455/456.1, 456.5
See application file for complete search history.

(56) References Cited

U.S. PATENT DOCUMENTS

| 6,731,940 B1* | 5/2004 | Nagendran | H04L 29/06 455/456.1 |
| 7,302,269 B1* | 11/2007 | Crawford | G01S 5/0289 455/13.2 |
| 2004/0248589 A1* | 12/2004 | Gwon | G01S 5/0252 455/456.1 |
| 2006/0009235 A1* | 1/2006 | Sheynblat | G01S 5/0036 455/456.1 |
| 2014/0114600 A1* | 4/2014 | Roth | G01K 15/005 702/99 |
| 2015/0018005 A1* | 1/2015 | Scarr | H04W 64/003 455/456.1 |

* cited by examiner

*Primary Examiner* — Joel Ajayi
(74) *Attorney, Agent, or Firm* — Sterne, Kessler, Goldstein & Fox P.L.L.C.

(57) ABSTRACT

Wireless access points within a GPS-Unavailable environment can provide location services to user equipment devices within the environment provided that the access points are aware of their precise locations. In order to calibrate the locations of the wireless access points, a user equipment is moved to specific locations within the environment. At each of those locations, the user equipment transmits calibration signals that include the transmission location as well as a timestamp of the transmission time. Upon receipt by the access points, these signals are timestamped with a reception timestamp by a clock that is synchronized with the clock of the user equipment. After accumulating sufficient calibration information from a sufficient number of calibration locations, the access points can accurately determine their locations using trigonometric and other functions.

15 Claims, 15 Drawing Sheets

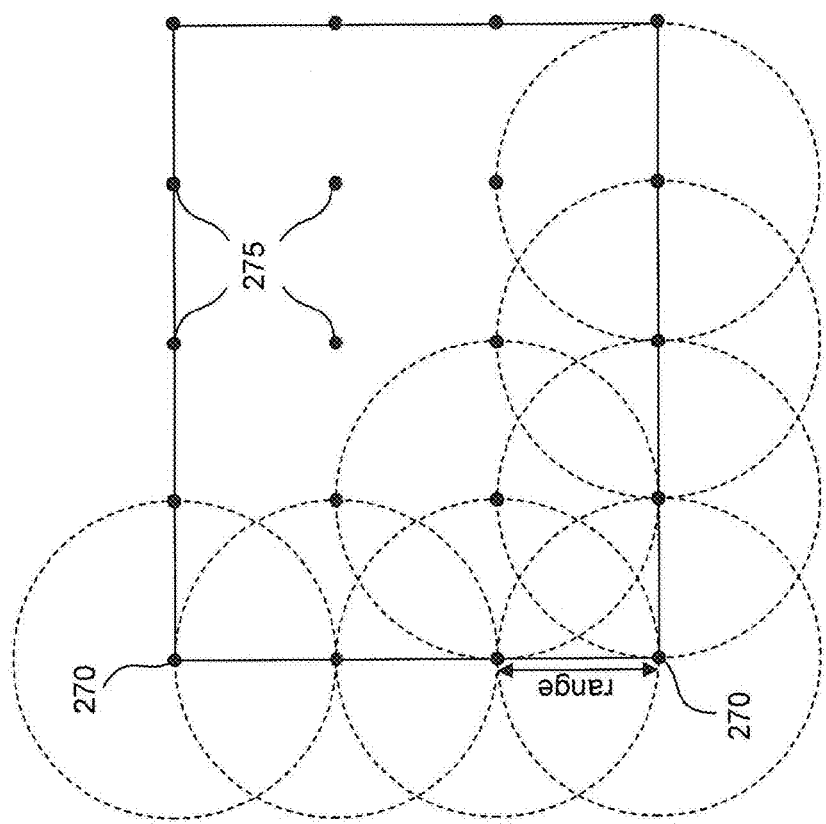

CALIBRATION OF WLAN ACCESS POINTS FOR LOCATION SERVICES

This patent application claims the benefit of U.S. Provisional Patent Application No. 62/258,358, filed Nov. 20, 2015, entitled "Calibration of WLAN Access Points for Location Services," which is incorporated herein by reference in its entirety.

BACKGROUND

Field

The disclosure relates to wireless communication, and specifically to a system and method for calibrating WLAN access points for accurate WLAN-based location services.

Related Art

Over the years, enhanced technology has allowed for individuals to more accurately determine their positions. For example, the advent of Global Position System (GPS) first allowed military personnel to determine their position to a very high degree of accuracy using a network of satellites orbiting the planet. This technology was eventually extended to the public sector, where it has flourished, beginning, with in-car GPS devices for mapping driving routes.

Over the years, the complexity of cellular telephone has dramatically increased, and now typically includes a GPS receiver for allowing location services. The GPS receiver in cellular telephones operates in the same manner as stand-alone GPS receivers, relying on signals from the GPS satellite network to calculate a position. Once this position is known, the device can utilize the information in a number of different ways. For example, a common application is still to use the determined location for mapping purposes. However, there are a host of other applications, such as geo-fence applications, in which the device will perform certain functions and/or configure itself in certain ways depending on its location.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

FIGS. 2A-2D illustrate exemplary wireless communication environments;

DETAILED DESCRIPTION

Figure 1:
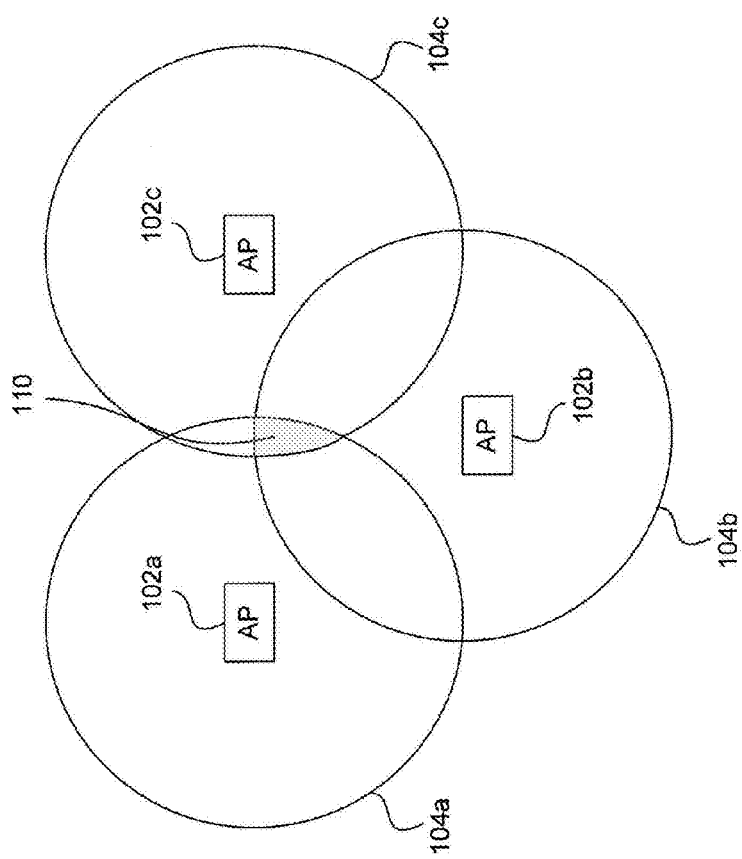
FIG. 1 illustrates an exemplary WLAN environment.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

Embodiments may be implemented in hardware (e.g., circuits), firmware, computer instructions, or any combination thereof. Embodiments may be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, or other hardware devices Further, firmware, routines, computer instructions may be described herein as performing certain actions. However, it should be appreciated that such descriptions are merely for convenience and that such actions in fact results from computing devices, processors, controllers, or other devices executing the firmware, routines, instructions, etc. Further, any of the implementation variations may be carried out by a general purpose computer, as described below.

For purposes of this discussion, the term "module" shall be understood to include at least one of hardware (such as one or more circuit, microchip, processor, or device, or any combination thereof), firmware, computer instructions, and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Those skilled in the relevant art(s) will recognize that this description may be applicable to many various wireless systems, and should not be limited to small/femto cells.

An Exemplary Wireless Environment

FIG. 1 illustrates an exemplary wireless communication environment 100. Several access points 102 are distributed throughout the environment to provide WLAN communications to a user equipment (UE). Each of the access points has a particular range associated with it. When the locations of the access points are known, so long, as a UE is within range of multiple access points, the UE within the environment can pinpoint its location based on signals received from multiple access points using any of a number of different methods.

Provided that the UE is within range of two of the access points, the UE can employ triangulation based on signals received from those access points, and their locations. As is known, triangulation uses trigonometric functions to calculate position by measuring angles from the two known locations.

Alternatively, provided that the UE is within range of three access points, the UE can employ trilateration to determine its location. As is known, trilateration is the process of determining location by measuring distances based on the geometry of circles, spheres, or triangles associated with known locations. In the wireless communication context, trilateration is typically performed using circles (for relative 2-dimensional space) or spheres (for three-dimensional space).

By receiving a signal from a particular access point, the UE is able to determine its distance from that access point. This can be performed in a number of ways, as will be discussed herein. However, knowing the distance from a point provides only a circle (or sphere) of possible locations. In order to pinpoint its location, the UE combines this knowledge with similar knowledge relating to other known locations. For example, as shown in FIG. 1, using signals received from each of the access points 102, the UE calculates a distance circle 104a relative to access point 102a, a distance circle 104b relative to access point 102b, and a distance circle 104c relative to access point 102c. Assuming a small level of error, the UE is able to pinpoint its location with relatively high accuracy to area 110.

In order for the access points to assist with location calculations, in accordance with the above, it is necessary for the access points to know their locations. Although this can be relatively easily performed in GPS-accessible areas, the task becomes far more arduous and complex in areas where GPS is not available. WLAN access points are most commonly employed inside buildings, such as offices, schools, etc.—locations where GPS is generally not available due to a lack of line-of-sight to satellites. Previous methods of calibrating access point locations involved mapping and measuring out locations by hand from known locations. This is extremely tedious, expensive, and error-prone. In addition, because of the difficulty in performing this calibration, the system is also extremely rigid and not easily reconfigurable. In other words, relocating or rearranging access points would incur significant additional effort and expense.

Thus, there is needed a system and method for efficiently and accurately calibrating the locations of access points to be used in location services in GPS-unavailable locations.

Figure 2A:
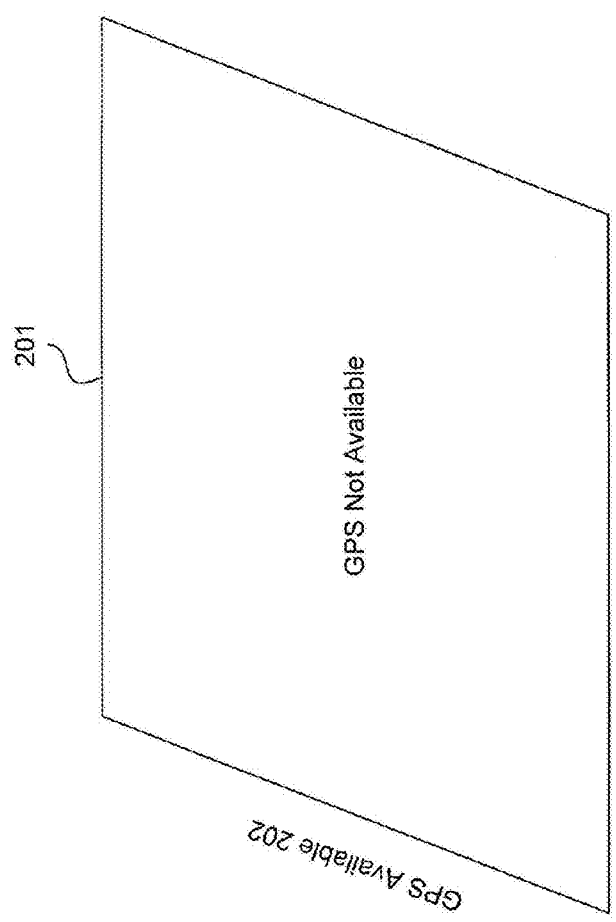

FIG. 2A shows an exemplary location environment 200. The environment 200 includes a GPS-Available area 202, and a GPS-Unavailable area 201. It is within the GPS-Unavailable area, such as an office building, that this disclosure is meant to primarily address, as will be seen below. However, it should be understood that these concepts can be applied to all coordination areas, including where GPS or other location services are available for performing location services.

Figure 2B:
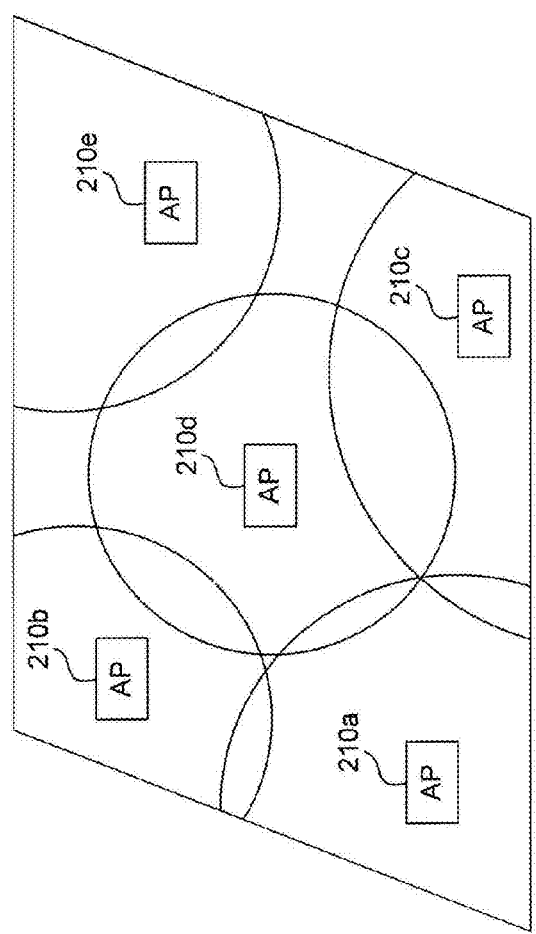

FIG. 2B illustrates the location environment 200, focusing on the GPS-Unavailable area 201. Within the GPS-Unavailable area 201, there may be several WLAN access points 210 distributed throughout the area. Each of these access points may have a corresponding range, as shown in FIG. 2B. A system and corresponding methods will now be described relative to the figures for performing efficient location calibration of the access points 210.

Calibration System

In order to calibrate the locations of the access points 201, there are a number of components that can be used in different combinations: a UE, as will be discussed relative to FIG. 3; the access points, as will be discussed relative to FIG. 4; and a server, as will be discussed relative to FIG. 4.

In a first embodiment, the UE is used to transmit time-stamped packets from known locations. The packets are transmitted to one or more access points 210 in the environment 200, and notify the access points of the transmission location and the time transmitted. The access points 210 time stamp the arrival of these packets, in order to determine a distance from the transmission location. By accumulating this information from multiple transmission locations, this information can then be used, either by the access points themselves or by the server, in a reverse-trilateration algorithm to determine the access point locations. Other similar calibration methods will be discussed herein.

User Equipment

Figure 3:
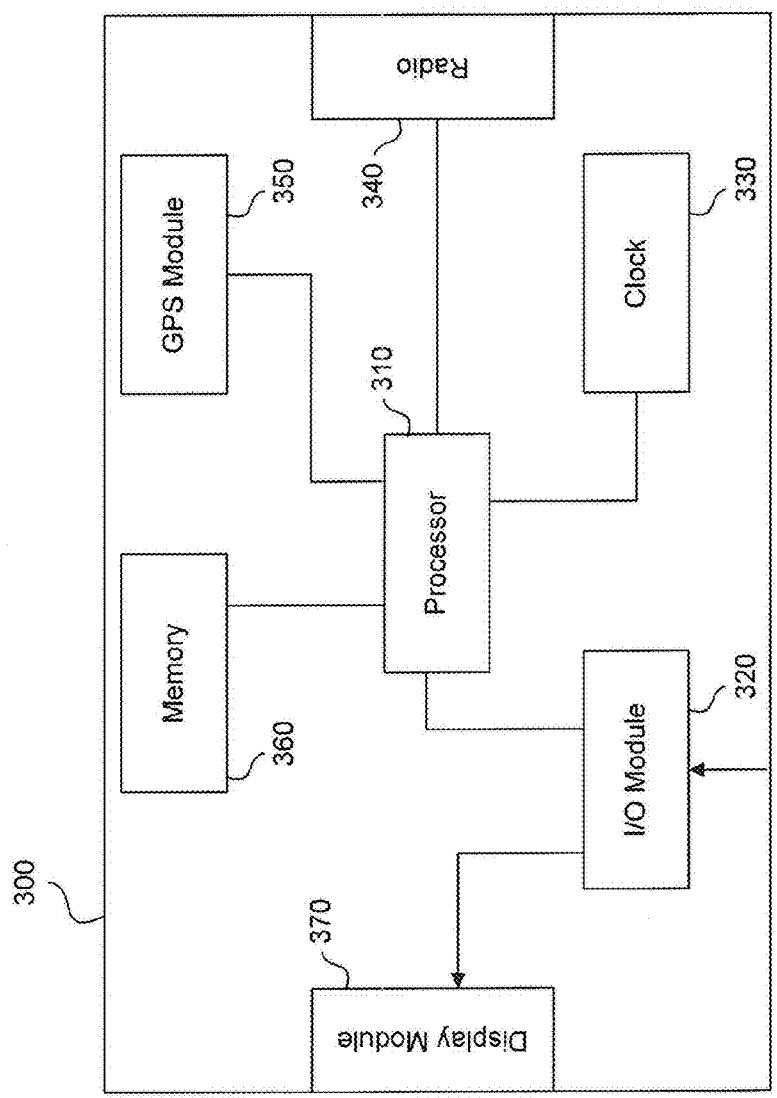
FIG. 3 illustrates a block diagram of an exemplary user equipment that may perform the calibration within the wireless communication environment.

FIG. 3 illustrates an exemplary user equipment (UE) 300 according to an exemplary embodiment of the present disclosure. The UE 300 includes a processor 310 that performs general processing and control of the UE. An I/O module 320 is connected to the processor 310, and interfaces with a user of the UE 300. The I/O module 320 may provide a user interface, such as a graphical user interface (GUI), for providing to the user, as well as receive user inputs and control, including messages for user action. A display 370 may be provided to display the interface generated by the I/O module.

The UE 300 also includes a memory 360 for storing an algorithm and locations from which the UE will transmit calibration packets. In an embodiment, the locations are stored as geographical coordinates. The UE 300 also includes a radio 340 for wirelessly transmitting and receiving radio signals with nearby access points, and a clock 330. The radio 340 includes a transmitter and receiver to effect the wirelessly transmitting and receiving of radio signals; where each can include various mixer(s) and local oscillator(s) for frequency conversion, in addition to amplifiers and filters for signal conditioning, as will be understood by those skilled in the arts. The clock is synchronized with similar clocks located at each of the access points in the environment. In an embodiment, the UE 300 also includes a GPS module 350 that receives and processes GPS signals from GPS satellites for determining global location.

Before calibration can occur, the UE 300 needs to be programmed with the calibration locations (e.g. also called transmission locations). The calibration locations will be the locations from which the UE 300 transmits calibration packets for use by the access points to determine their locations. In this embodiment, the calibration locations are programmed ahead of time using calibration mapping algorithm. This algorithm can be located on the device itself, or on a separate device, such as a personal computer. For example, the calibration algorithm can be stored in the memory 360, and executed by the processor 310 to implement the functionality described herein, or can be hard-coded in the processor 310 itself.

Calibration Algorithm

In this embodiment, the calibration algorithm is provided a map of the GPS-Unavailable area. In its simplest form, the algorithm ignores the layout of the access points within the GPS-Unavailable area, and instead simply calculates calibration locations so that all areas within the GPS-Unavailable area will be reached by three separate calibration transmissions. This is the simplest way to ensure that all access points can be calibrated, but can result in added expense during the actual calibration phase, which may require many more calibration transmissions than necessary from the UE 300. The calculation of the calibration locations can be based on a known transmission range of the UE 300 and/or minimum ranges of potential access points within the environment. Additionally, the calculation can be expanded to three-dimensional space if desired. This is particularly useful in multi-level buildings.

In this embodiment, the algorithm assumes that the maximum range of a calibration transmission is equal to a minimum range of an access point. The algorithm then calculates calibration locations such that the transmission range circles encapsulating each of those points sufficiently overlap to cover the entire area of the GPS-Unavailable area. This can be done, for example, as shown in FIG. 2C by first placing calibration locations 270 at the corners of the area, and then placing additional calibration locations 275 in a grid-like fashion, spaced apart from each other by the maximum range.

In an alternative embodiment, the algorithm can be provided with a map of the GPS-Unavailable area, as above. However, in addition to this map, the algorithm can also receive information detailing estimated locations of the access points. This information may be received, for example, as annotations to the map, or as distances from other known locations and/or landmarks on the map. As an example, an access point may be described as approximately 10 feet from the south wall, 15 feet from the east wall, on the third floor. Using these approximate locations, the algorithm can better determine the calibration locations.

Figure 2D:
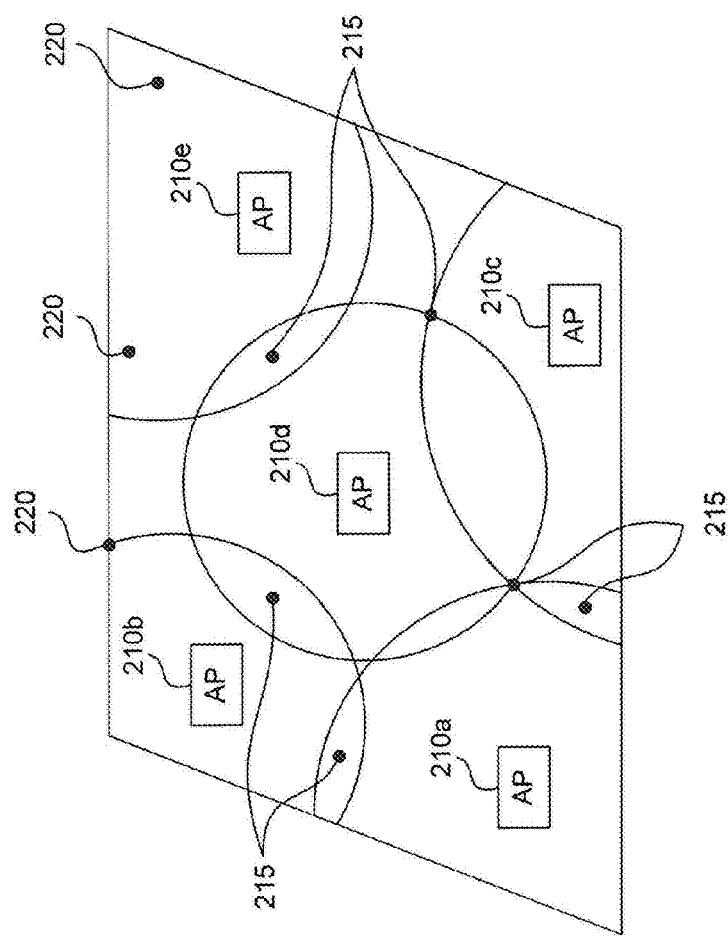

For example, FIG. 2D shows the GPS-Unavailable area 201, and several access points 210 located throughout. If the algorithm is provided with the approximate locations of the access points 210, and knows the minimum ranges of the access points, then the algorithm can calculate the calibration locations in a manner to minimize the number of calibration transmissions. For example, since each access point requires only three calibration transmissions to successfully pinpoint its location, the algorithm can start by identifying calibration locations 215 at which access point coverages overlap. This will allow a single calibration transmission to be used by more than one access point. Once those locations have been determined, other calibration locations 220 can be chosen to fill out each access point to a minimum of three transmissions.

Once the algorithm has identified the calibration locations, the algorithm can inform a user using the I/O module 320 and the display 370, and load the calibration locations into the memory 360 of the UE 300.

Access Point

Figure 4:
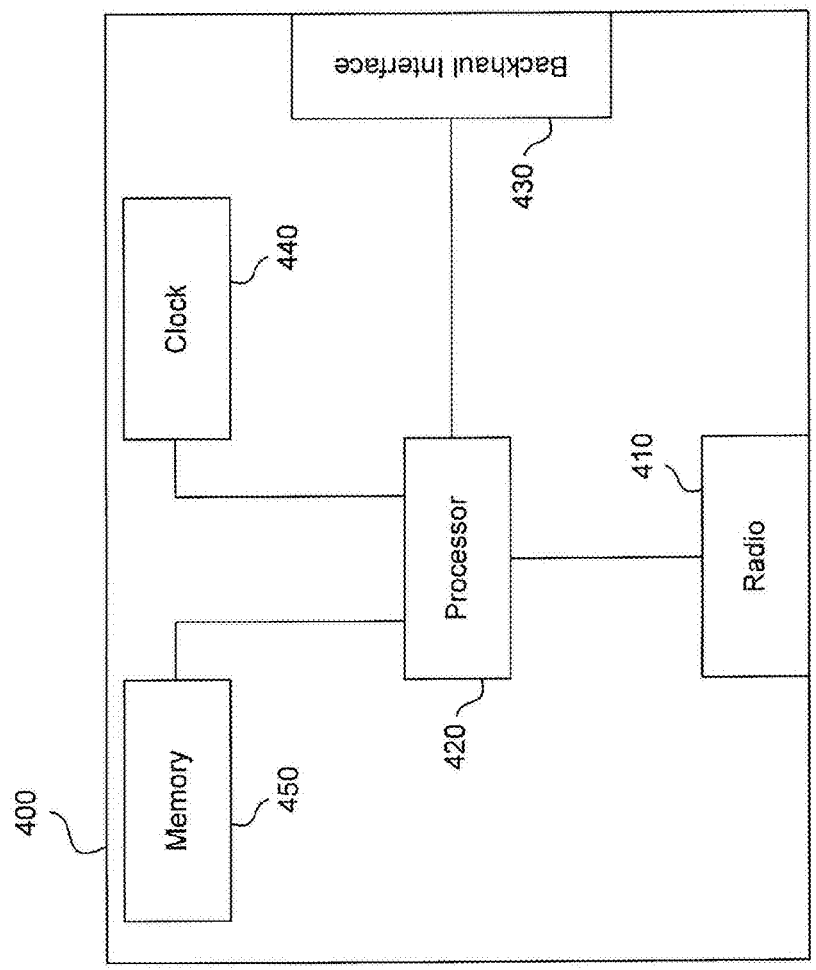
FIG. 4 illustrates a block diagram an exemplary WLAN access point that may be calibrated within the wireless communication environment.

FIG. 4 illustrates a block diagram of an exemplary wireless access point 400. The access point 400 includes a radio 410 that is configured to wirelessly transmit and/or receive wireless communications to/from a UE in the environment. The radio 410 is connected to a processor 420 that performs the general processing and control functionality of the access point 400. The processor is also connected to a backhaul interface 430. The backhaul interface 430 is a communication interface between the access point 400 and some backhaul, such as a server. The backhaul interface 430 can be a wired or wireless communication interface.

The processor 420 is also connected to a clock 440 and a memory 450. The clock 440 is synchronized with the clock of the calibration UE 300, and the memory 450 is used to store calibration packets and locations received from the calibration UE, in addition to computer instructions that when executed by processor 420 implement the functionality described herein for the access point.

Server

Figure 5:
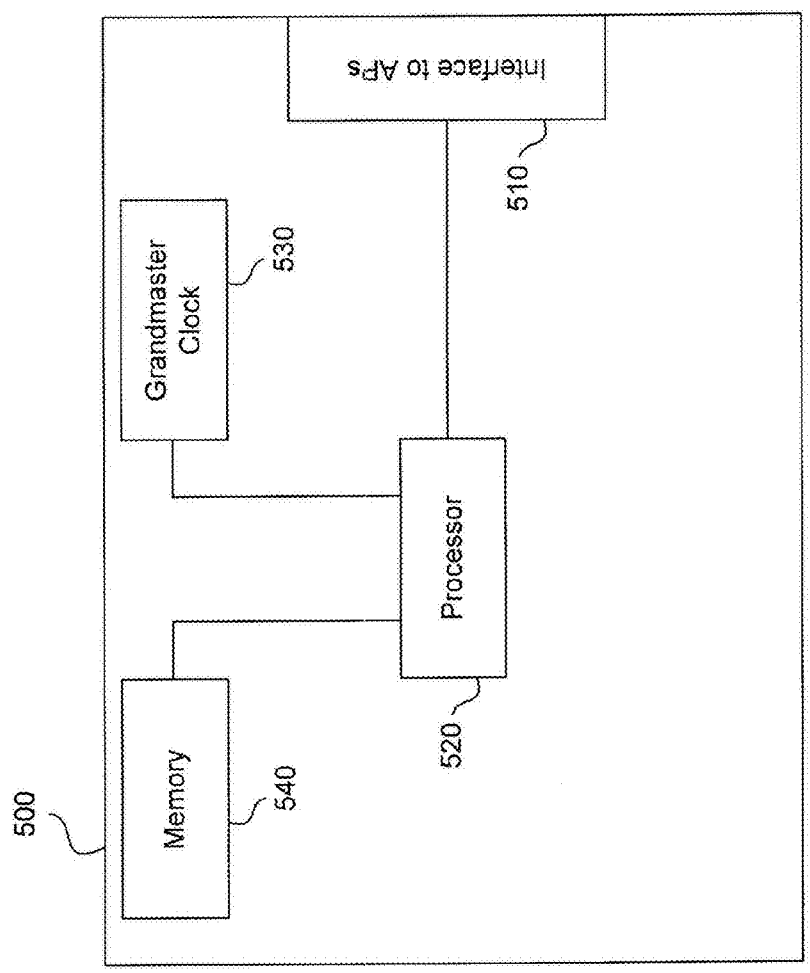
FIG. 5 illustrates a block diagram of an exemplary server that may assist with calibration.

FIG. 5 illustrates a block diagram of an exemplary server 500. The server includes an access point interface 510 that receives data from the access points located throughout the GPS-Unavailable area. This information may include the calibration information collected by the access points. The access point interface 510 provides the information to a processor 520. The processor 520 controls general processing within the server, and also performs location calculations based on the received information, as will be described below.

The processor is connected to a grandmaster clock 530 and a memory 540. In an embodiment, the grandmaster clock 530 is not located on the server, but rather is separate therefrom and can be accessed by the server 500. The grandmaster clock 530 provides a reference clock time that will be used to synchronize the clock 440 of the access point and the clock 330 of the UE. The server 500 uses the memory 540 to store the calibration information received from the different access points. This stored information can then be accessed once sufficient information has been accumulated in order to calculate the positions of the access points. The memory 540 can also store computer instructions, that when executed by the processor 520 implement the functionality described herein.

The methods employed by the system for calibrating the location of the access points will now be described with respect to the figures.

Location Calibration

In order to calibrate the locations of the access points, the UE 300 is first loaded with the calibration locations that were calculated by the algorithm in accordance with the above discussions. The locations are loaded in to the memory 360 of the UE 300 via the I/O module 320. In an embodiment, the locations are loaded with a description that can be provided to the user to assist with placing the UE 300 at the correct calibration location. For example, the processor 310 reading the next calibration location from memory 360 will send the description to the I/O module 320 for displaying to the user via a message on the display 370. Such a description may include measurements to the location, such as "15 feet from the east wall and 10 feet from the south wall." When processed by the processor 310, the output message displayed to the user may state, for example, "Please place the device 15 feet from the east wall and 10 feet from the south wall, and then press 'Transmit'."

Using the directive, or by other methods of locating the actual calibration location, the user places the UE 300 at the first calibration location. Once at the calibration location, the user inputs a command via the user interface managed by the I/O module 320 to transmit the calibration packets. This causes the processor 310 to retrieve the location from the memory 360. Whereas the location description may be words or other descriptors, the location itself should preferably be more exact and universal, such as geographical coordinates. The processor 310 prepares one or more calibration packets to transmit. The calibration packets include the location retrieved from memory, as well as a timestamp acquired from the clock 330. Once the packets are prepared, the processor 310 transmits the calibration packets to the environment via the radio 340.

The calibration packets are received by all access points 400 within range of the transmission. For example, access point 400 receives the calibration packets via its radio 410. The packets are provided to the processor 420, which retrieves a current time from the clock 440. Using the retrieved time, the processor stores the location information extracted from the calibration packets in the memory 450 in correspondence with the time information extracted from the calibration packets, as well as the time retrieved from the clock 440. This information is stored in the memory 450 until at least two additional calibration packets are received from additional calibration locations. Once sufficient data has been collected, the processor 420 retrieves all of the collected calibration data and forwards the calibration data to the server via the backhaul interface 430 for location calculation.

In an embodiment, the processor 420 can forego storing the calibration information in the memory 450, and instead forwards the calibration information (transmission location, transmission time, and receive time) to the server after each reception. The server can the accumulate the calibration information on behalf of the access point 400. Also, in an embodiment, the processor 420 can perform the location calculation itself, once sufficient calibration information has been collected. However, this could have a negative impact on power consumption, calculation accuracy, and complexity of the access point 400.

The server 500 receives the calibration information via the access point interface 510. The calibration information is provided to the processor, which stores the calibration information in the memory 540. The processor then performs location calculations using, the acquired calibration information.

For example, for each access point, the processor 520 analyzes its corresponding calibration information to determine the location of the access point. In order to calculate the location, the processor 520 first calculates a time difference of arrival (TDOA) with respect to each of the packets. To provide an example, by subtracting the transmission time from the receive time, the processor 520 can determine a distance of the access point from the corresponding transmission location. For example, if the approximate propagation speed of the transmission $v_p$ is known, then the distance can be computed as follows:

$$d = (T_r - T_t) * v_p \quad (1)$$

There may be other ways to calculate the distance in accordance with the spirit and scope of the disclosure. As discussed above, although the distance can be calculated from a single calibration location, this only provides a circle (or sphere) of possible locations. However, the processor 520 repeats this calculation for each of the datasets from each of the calibration locations. The result of these calculations is, as illustrated in FIG. 1, a plurality of distance circles that are each centered over their respect transmission locations. Thus, after calculating the distances, the processor 520 pairs those distances with their corresponding transmission locations to produce a mapping of those circles relative to each other, such as illustrated in FIG. 1. The overlap of those distance circles is then determined by the processor 520 to be an estimation of the access point location 110.

Figure 11A:
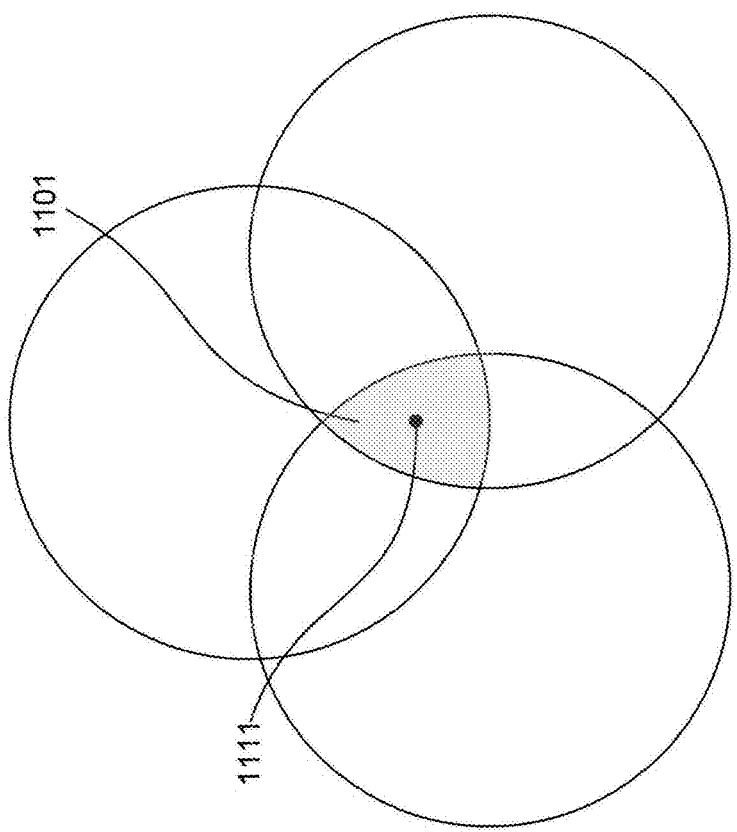
FIGS. 11A-11B illustrate various distance circle configurations according to various aspects of the present disclosure.
Figure 11B:
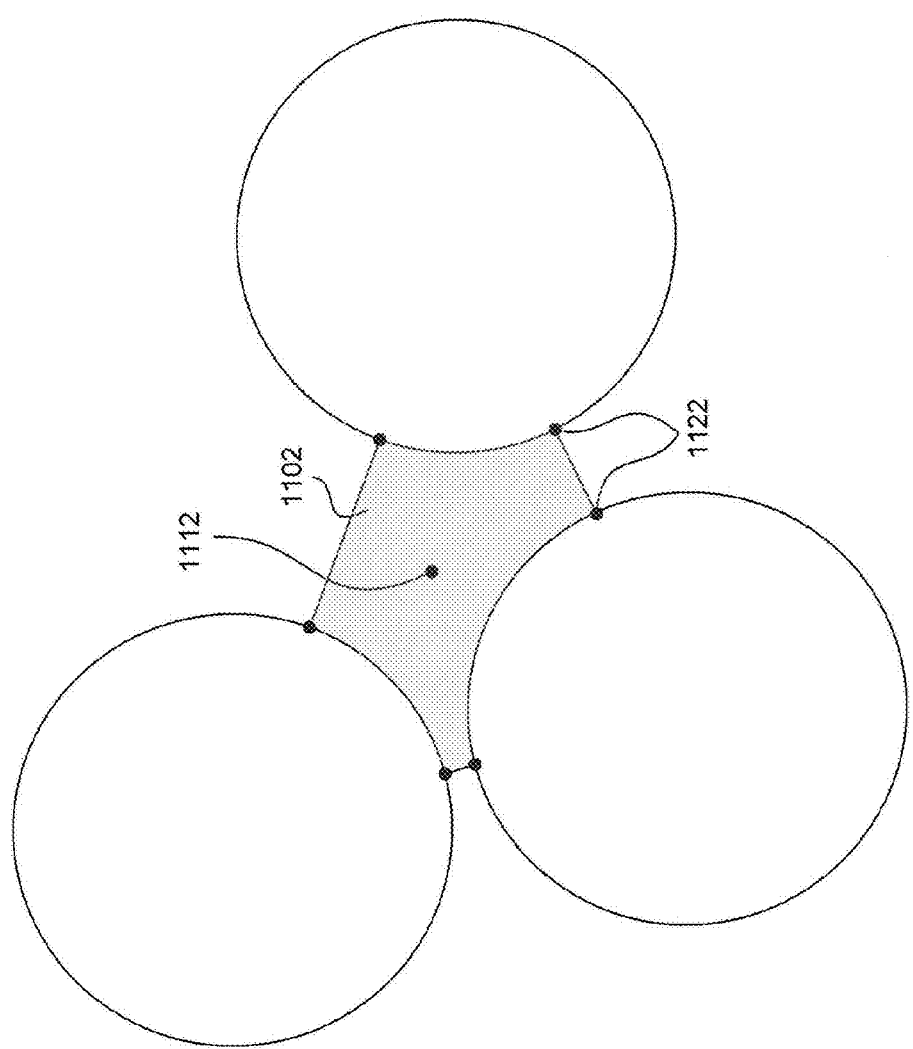

As illustrated in FIG. 11A, due to error, the distance circles may not meet at a single point, but rather may overlap to create a location area 1101. Alternatively, as shown in FIG. 11B, the distance circles may not overlap at all, resulting in an area of non-overlap 1102. In the former scenario, the processor 520 will calculate a center point 1111 of the overlap area as the location of the access point 400. In the latter scenario, the processor 520 will calculate a center point 1112 of the non-overlapping area as the location of the access point 400. In the case of non-overlap, the processor determines the area of non-overlap based on the points 1122 of the circles that are closest in proximity to adjacent circles. By determining these points 1122, the processor defines the bounds of the area for purposes of calculating the center point 1112.

Once the processor 520 has calculated the location of the access point 400, the processor 520 transmits the location to the corresponding access point 400 via the access point interface 510. The access point 400 receives its location via its backhaul interface 430, and stores the location in memory 450 for later use.

Alternative Calibration Method

In an alternative embodiment, access points can be used as calibration locations. Because the clocks 440 of the access points 400 are synchronized with the clock 330 of the UE 300, the access points 400 can themselves transmit calibration packets once they know their locations.

For example, the UE 300 can be used at three calibration locations about a first access point. This provides sufficient data for the server 500 to determine the location of the first access point 400. Once the first access point has been notified of its location, the first access point can transmit its own calibration packets that include its location and transmission time. These packets are received by other access points in range. This data can then be collected and combined with data received from the UE 300 and/or other access points in order to determine their locations.

To provide an example, a user is trying to calibrate the locations of three access points. The user uses the UE 300 to transmit calibration information from two calibration locations that are within range of all three of the access points, and then transmits calibration information from a third location that is accessible only by a first access point. The first access point now has three calibration datasets by which to determine its location. After determining its location, the first access point transmits calibration data with its location and transmission timestamp, which is received by a second access point. The second access point now has three calibration datasets by which to determine its location. After determining its location, the second access point transmits calibration data with its location and transmission timestamp, which is received by the third access point. The third access point now has three calibration datasets by which to calculate its location. By using this "spiderweb" approach, the system can greatly reduce the amount of work required by the user by reducing the number of transmissions required to calibrate the system.

Figure 6:
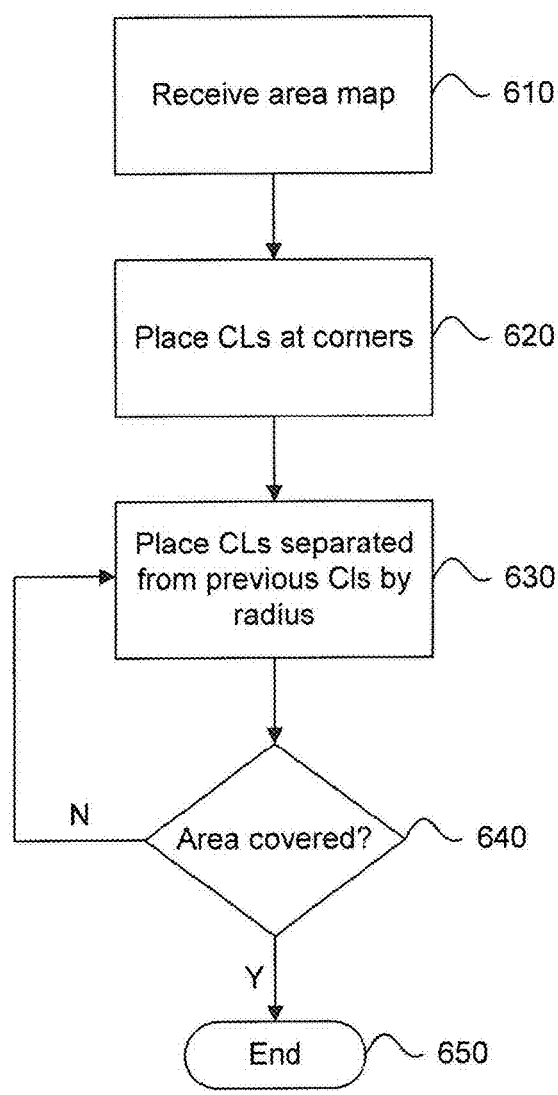
FIG. 6 illustrates a flowchart diagram of an exemplary method for configuring the user equipment.

Exemplary Methods for Calibrating Access Point Locations within a Wireless Environment FIG. 6 illustrates a flowchart diagram of an exemplary method 600 for configuring the UE 300. The method 600 can be performed, for example, by the processor 310 of the UE 300, according to computer instructions stored in the memory 360, or according to hard-wired logic of processor 310. First, the calibration mapping algorithm receives an area map of the GPS-Unavailable area (610). Using this area, the algorithm then determines the calibration locations. For example, the algorithm begins by placing calibration locations at each of the corners of the area defined by the map (620). Additional calibration locations are placed such that the circumference of a circle centered about a calibration location, with radius equal to a minimum range of an access point, intersects with the previously placed calibration locations (630). A check is then made to determine whether the entire area has been covered (640). If the entire area has not been covered (640-N), then the method returns to step 630 to place additional calibration locations. If, on the other hand, the entire area has been covered (640-Y), then the method ends (650).

Figure 7:
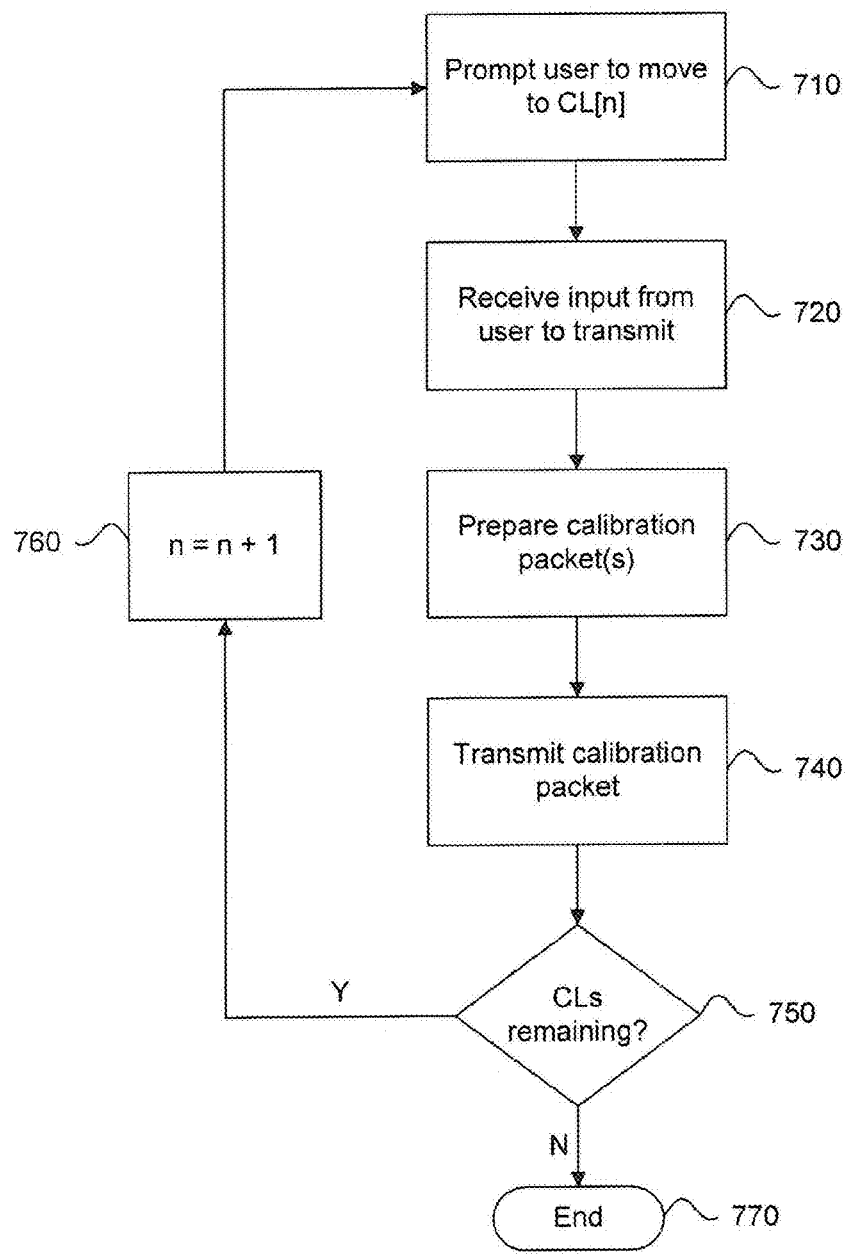
FIG. 7 illustrates a flowchart diagram of an exemplary method for performing the calibration by the user equipment.

FIG. 7 illustrates a flowchart diagram of an exemplary method 700 for performing the calibration by the UE 300. The method 700 can be performed or coordinated, for example, using the processor 310 of the UE 300, according to computer instructions stored in the memory 360, or according to hard-wired logic of processor 310. The method begins by the UE 300 prompting the user to move to the first calibration location (710). The UE 300 then receives an input from the user to transmit the calibration packets associated with the first calibration location (720). In response, the UE 300 prepares the calibration packets that include the calibration information described above (730). After the calibration packets have been prepared, the UE 300 transmits the calibration packets to the environment (740).

The UE 300 then checks to determine whether there are additional calibration locations remaining (750). If there are additional calibration locations remaining (750-Y), then the UE 300 increments the calibration location (760) and repeats steps 710-750 with respect to the next calibration location. If there are no calibration locations remaining (750-N), then the method ends (770).

Figure 8:
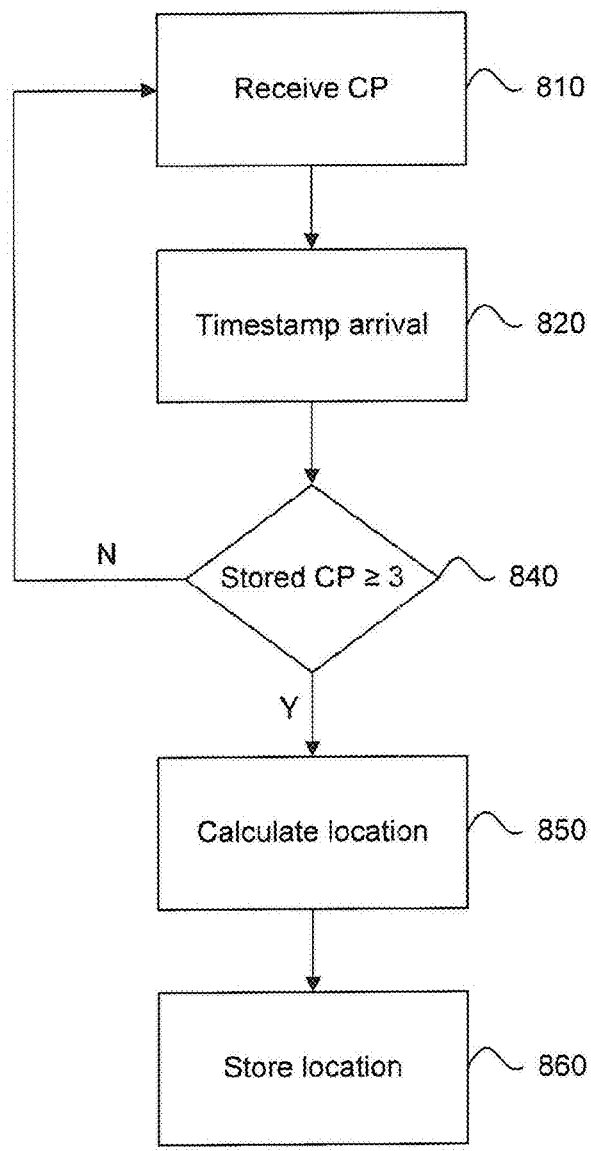
FIG. 8 illustrates a flowchart diagram of an exemplary method for calculating a location of the access point.

FIG. 8 illustrates a flowchart diagram of an exemplary flowchart diagram of a method 800 for calculating a location of the access point 400. The method 800 can be performed, for example, by the processor 420 of the access point 400, according to computer instructions stored in the memory 450, or according to hard-wired logic of processor 420. The access point 400 receives a calibration packet from the environment (810). The access point 400 timestamps the arrival of the calibration packet (820) and stores the calibration packet together with the arrival timestamp in memory (830).

The access point 400 then determines whether it has received sufficient calibration data (840). If there are fewer than 3 stored calibration datasets (840-N), then the method repeats steps 810-830. On the other hand, if there are three or more calibration datasets stored in the memory (840-Y), then a location can be calculated (850), and then stored (860).

Figure 9:
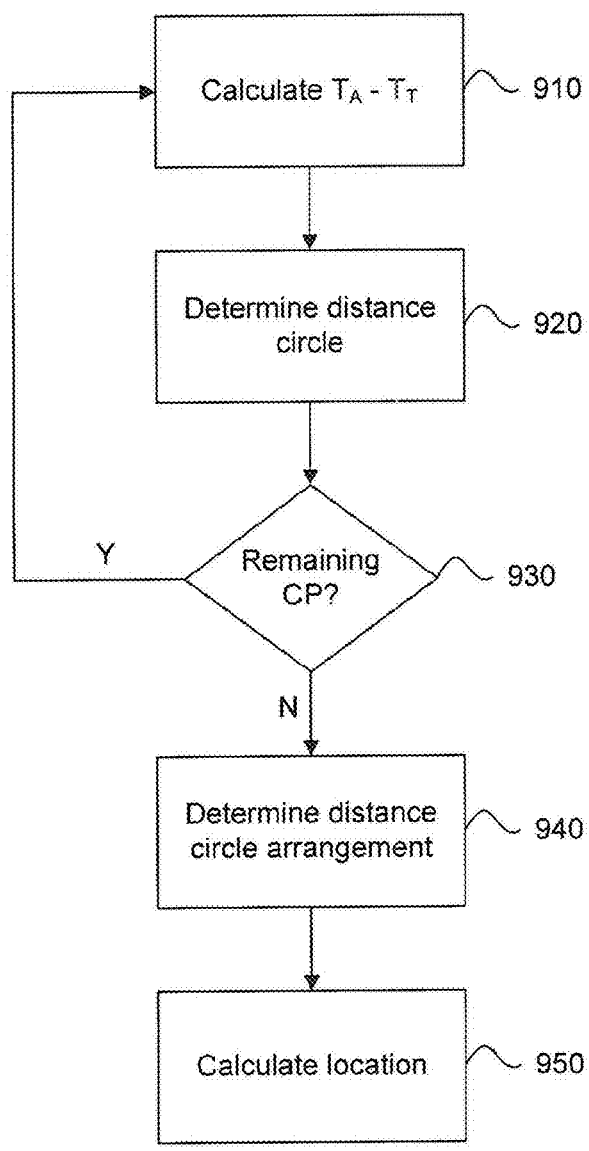
FIG. 9 illustrates a flowchart diagram of an exemplary method for calculating the location of the access point based on the calibration information.

FIG. 9 illustrates a flowchart diagram of an exemplary method 900 for calculating the location of the access point 400 based on the calibration information. This method may be performed by the access point 400, or by a separate server 500. The method 900 can be performed, for example, by the processor 420 of the access point 400, according to computer instructions stored in the memory 450, or according to hard-wired logic of processor 420. Alternatively the method 900 can be performed, for example, by the processor 520 of the server 500, according to computer instructions stored in the memory 540, or according to hard-wired logic of processor 520.

First, a TDOA is calculated for a calibration packet by subtracting the transmission time from the arrival time of the packet (910). Then, a distance circle is determined by multiplying the TDOA with the propagation speed of the transmission (920). Steps 910-920 are then repeated for each of the calibration packets based on a determination as to whether there are calibration packets remaining (930).

Once there are no further calibration packets remaining (930-N), the distance circles are mapped by centering the distance circles over their corresponding transmission locations (940). The location is then calculated based on the mapping (950), by one of: (a) finding the common point of intersection of the distance circles; (b) calculating a center of overlap of the distance circles; or (c) calculating a center of non-overlap of the distance circles.

After the location has been determined 950/850, the access point stores the location in memory for future use (860).

It should be understood that the above descriptions of the exemplary methods 600-900 may include any of the functionality described herein with respect to the exemplary UE 300, access point 400, and/or server 500.

Exemplary Computer System Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 10:
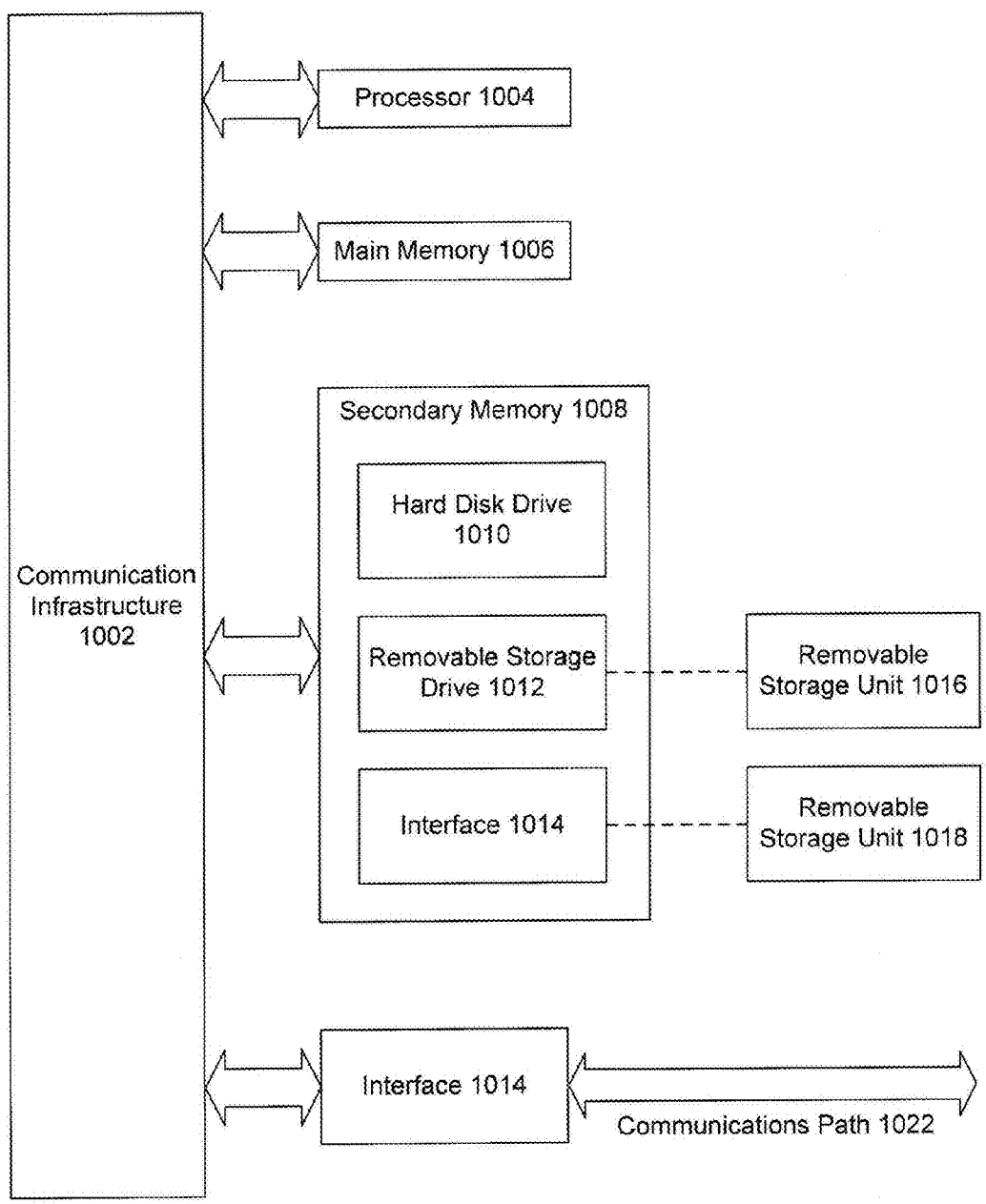
FIG. 10 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of flowcharts 600, 700, 800, and 900 can be implemented in the environment of a computer system or other processing system. An example of such a computer system 1000 is shown in FIG. 10. One or more of the modules depicted in the previous figures can be at least partially implemented on one or more distinct computer systems 1000.

Computer system 1000 includes one or more processors, such as processor 1004. Processor 1004 can be a special purpose or a general purpose digital signal processor. Processor 1004 is connected to a communication infrastructure 1002 (for example, a bus or network). Various software implementations are described in terms of this exemplary computer system. After reading this description, it will become apparent to a person skilled in the relevant art(s) how to implement the disclosure using other computer systems and/or computer architectures.

Computer system 1000 also includes a main memory 1006, preferably random access memory (RAM), and may also include a secondary memory 1008. Secondary memory 1008 may include, for example, a hard disk drive 1010 and/or a removable storage drive 1012, representing a floppy disk drive, a magnetic tape drive, an optical disk drive, or the like. Removable storage drive 1012 reads from and/or writes to a removable storage unit 1016 in a well-known manner. Removable storage unit 1016 represents a floppy disk, magnetic tape, optical disk, or the like, which is read by and written to by removable storage drive 1012. As will be appreciated by persons skilled in the relevant art(s), removable storage unit 1016 includes a computer usable storage medium having stored therein computer software and/or data.

In alternative implementations, secondary memory 1008 may include other similar means for allowing computer programs or other instructions to be loaded into computer system 1000. Such means may include, for example, a removable storage unit 1018 and an interface 1014. Examples of such means may include a program cartridge and cartridge interface (such as that found in video game devices), a removable memory chip (such as an EPROM, or PROM) and associated socket, a thumb drive and USB port, and other removable storage units 1018 and interfaces 1014 which allow software and data to be transferred from removable storage unit 1018 to computer system 1000.

Computer system 1000 may also include a communications interface 1020. Communications interface 1020 allows software and data to be transferred between computer system 1000 and external devices. Examples of communications interface 1020 may include a modem, a network interface (such as an Ethernet card), a communications port, a PCMCIA slot and card, etc. Software and data transferred via communications interface 1020 are in the form of signals which may be electronic, electromagnetic, optical, or other signals capable of being received by communications interface 1020. These signals are provided to communications interface 1020 via a communications path 1022. Communications path 1022 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1016 and 1018 or a hard disk installed in hard disk drive 1010. These computer program products are means for providing software to computer system 1000.

Computer programs (also called computer control logic) are stored in main memory 1006 and/or secondary memory 1008. Computer programs may also be received via communications interface 1020. Such computer programs, when executed, enable the computer system 1000 to implement the present disclosure as discussed herein. In particular, the computer programs, when executed, enable processor 1004 to implement the processes of the present disclosure, such as any of the methods described herein. Accordingly, such computer programs represent controllers of the computer system 1000. Where the disclosure is implemented using software, the software may be stored in a computer program product and loaded into computer system 1000 using removable storage drive 1012, interface 1014, or communications interface 1020.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long, as the specified functions and relationships thereof are appropriately performed.

It will be apparent to those skilled in the relevant art(s) that various changes in form and detail can be made therein without departing from the spirit and scope of the disclosure.

What is claimed is:

1. A wireless communication device, comprising:
   a clock configured to track a current time;
   a memory that stores a calibration location;
   a processor configured to, in response to an input, generate a calibration signal that includes the calibration location and the current time;
   an input-output (I/O) module configured to generate a message to cause the wireless communication device to be moved to the calibration location, and to receive the input to generate the calibration signal; and
   a radio configured to transmit the calibration signal to a wireless communication environment,
   wherein the calibration location is a location of the wireless communication device at a time of transmitting the calibration signal,
   wherein the memory stores a plurality of calibration locations, and
   wherein the processor is further configured to, after transmitting the calibration signal, cause the I/O module to generate a message to cause the wireless communication device to be moved to a second calibration location of the plurality of calibration locations.

2. The wireless communication device of claim 1, wherein the clock is synchronized with a plurality of access points located in the wireless communication environment.

3. The wireless communication device of claim 2, wherein the calibration signal is generated by selecting one of the calibration locations from the memory.

4. The wireless communication device of claim 1, further comprising a global positioning system (GPS) module configured to determine a current location of the wireless communication device in response to determining that GPS signals are available.

5. The wireless communication device of claim 4, wherein the processor is further configured to, in response to receiving the input, compare the current location with the calibration location, determine whether the current location is within a predetetmined distance of the calibration location, and transmit the calibration signal based on the determination.

6. A wireless communication device, comprising:
   a memory;
   a radio configured to receive a calibration signal from an external wireless communication device, the calibration signal including calibration information that includes at least a transmission location and a transmission time associated with transmission of the calibration signal;
   a clock configured to track a current time; and
   a processor configured to acquire a timestamp from the clock upon receipt of the calibration signal corresponding to a time of receipt of the calibration signal, extract the calibration information from the calibration signal, and store the extracted calibration information and the timestamp together in the memory, wherein the processor is further configured to calculate a location of the wireless communication device based on the extracted calibration information and the corresponding timestamp, wherein the extracted calibration information and the corresponding timestamp constitute a calibration dataset, wherein the processor is further configured to determine whether a predetermined number of calibration datasets have been accumulated in the memory, and wherein the processor is further configured to calculate the location only in response to determining that the predetermined number of calibration datasets have been accumulated in the memory.

7. The wireless communication device of claim 6, further comprising a backhaul interface, wherein the processor is configured to transmit the extracted calibration information and the corresponding timestamp to a server via the backhaul interface.

8. The wireless communication device of claim 7, wherein the wireless communication device is configured to receive its location from the server via the backhaul interface in response to transmitting the extracted calibration information and the corresponding timestamp.

9. A method of calibrating a location of an access point, the method comprising:

receiving a plurality of calibration signals from a plurality of corresponding calibration locations, each calibration signal including a transmission timestamp and a location identifier corresponding to the calibration location of the calibration signal, the calibration location being a location from which the calibration signal is transmitted;

timestamping each of the received plurality of calibration signals upon receipt with a reception timestamp;

determining that a number of the received plurality of calibration signals exceeds a predetermined threshold; and calculating the location of the access point based on the received plurality of calibration signals and the corresponding timestamps.

10. The method of claim 9, wherein the calculating includes:

calculating a time difference of arrival for each of the received plurality of calibration signals; and determining a distance circle associated with each of the calibration locations based on the time difference of arrivals.

11. The method of claim 10, wherein the calculating the time difference of arrival includes calculating a difference between the reception timestamp and the transmission timestamp.

12. The method of claim 10, wherein the calculating of the location further includes determining an area of overlap of the distance circles; and calculating a central location of the area of overlap as the location of the access point.

13. The method of claim 10, wherein the calculating of the location further includes determining an area of non-overlap of the distance circles, the area of non-overlap being an area between the distance circles bound by points on the distance circles of closest proximity to nearby distance circles; and calculating a central location of the area of non-overlap as the location of the access point.

14. The method of claim 10, wherein the received plurality of calibration signals includes three calibration signals corresponding to three different calibration locations.

15. The wireless communication device of claim 1, further comprising a global positioning system (GPS) receiver configured to receive a GPS location, wherein the memory is preloaded with the plurality of calibration locations, and wherein the processor is further configured to track the GPS location received from the GPS receiver, determine that the GPS location matches one of the plurality of calibration locations, and generate the calibration signal in response to the determination.

* * * * *